Figures 1, 2:
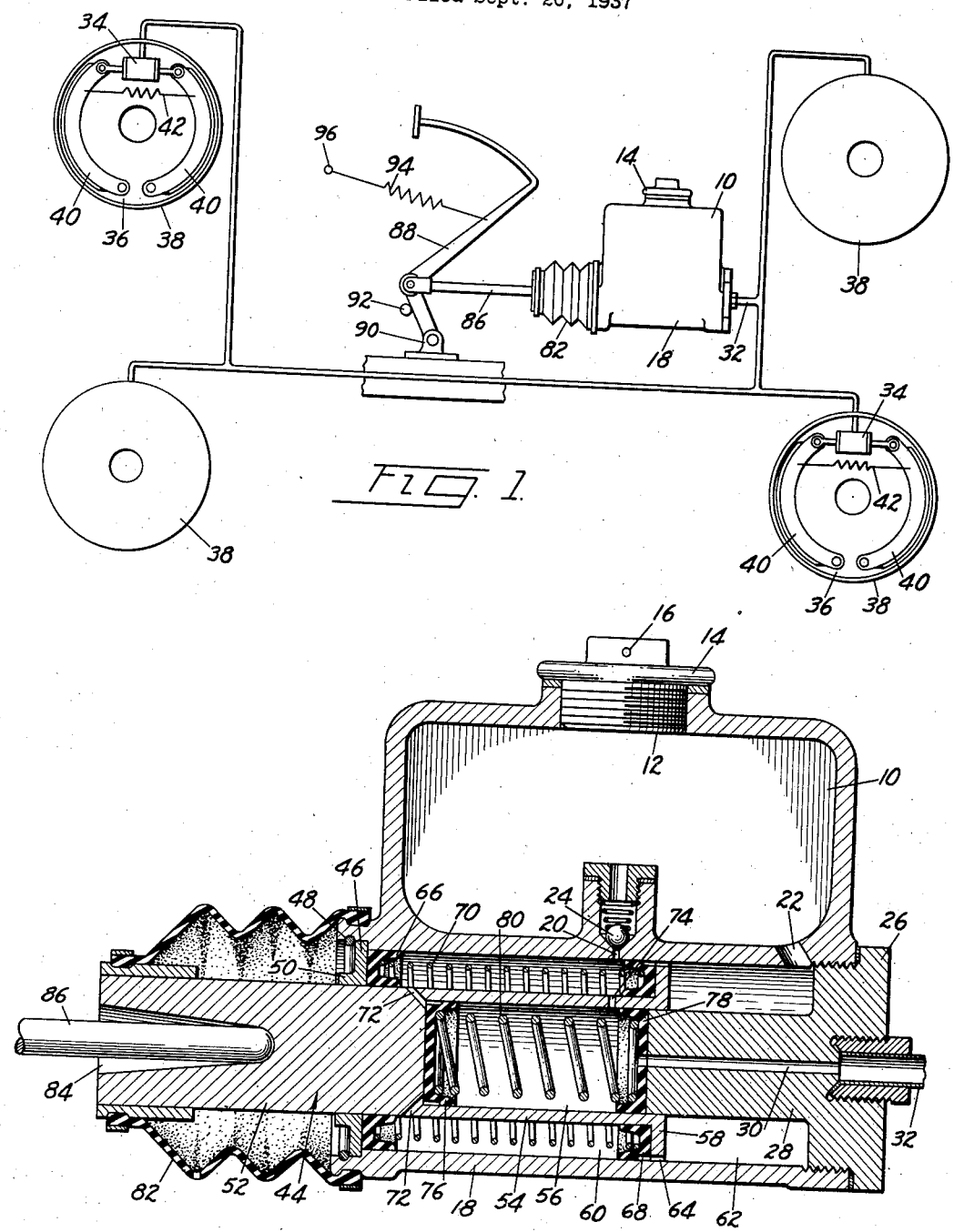

Sept. 10, 1940.   H. C. BOWEN   2,213,946
FLUID PRESSURE PRODUCING DEVICE
Filed Sept. 20, 1937

INVENTOR.
HERBERT C. BOWEN
BY
Williams, Bradbury, McCaleb & Hinkle
ATTORNEYS.

Patented Sept. 10, 1940

2,213,946

UNITED STATES PATENT OFFICE 2,213,946

FLUID PRESSURE PRODUCING DEVICE

Herbert C. Bowen, Detroit, Mich., assignor to Hydraulic Brake Company, Detroit, Mich., a corporation of California Application September 20, 1937, Serial No. 164,637

6 Claims. (Cl. 60—54.6)

This invention relates to fluid pressure braking systems and more particularly to fluid pressure producing devices for such systems.

An object of the invention is to provide a fluid pressure system including a fluid pressure producing device operative to overcharge the system so that the fluid in the system may be maintained under a predetermined pressure.

Another object of the invention is to provide a fluid pressure braking system including a fluid pressure producing device operative to maintain the system free from air or gas bubbles.

Other objects and advantages of the invention will appear from the following description, taken in connection with the drawing forming a part of this specification, and in which:

Fig. 1 is a schematic view of a fluid pressure braking system embodying the invention; and Fig. 2 is a vertical sectional view of the fluid pressure producing device.

Referring to the drawing, 10 represents a fluid reservoir having a filling opening 12, normally closed as by a plug 14, having openings 16 for venting the reservoir to the atmosphere. Formed at the base of the reservoir is a cylinder 18 having spaced ports 20 and 22 providing communications between the cylinder and the reservoir. The port 20 is controlled as by a check valve 24 inhibiting the flow of fluid from the reservoir to the cylinder and yet providing for a restricted flow of fluid from the cylinder to the reservoir, the restriction being proportionate to a predetermined load on the valve. The cylinder has one of its ends open and its other end closed as by a head 26 having a concentric extension 28 projecting axially within the cylinder, and the head and extension are axially bored to provide a discharge port 30 for the cylinder.

A fluid pressure delivery pipe or conduit 32 connected to the discharge port 30 has branches connected respectively to fluid pressure actuated motors 34 for the actuation of brakes of a motor vehicle. Preferably the brakes are arranged in pairs, one pair associated with the front wheels of the vehicle and another pair associated with the rear wheels of the vehicle.

The brakes may be of conventional type, each including a fixed support or backing plate 36, a rotatable drum 38 associated with the backing plate, a pair of corresponding interchangeable friction elements or shoes 40 pivoted on the backing plate, a retractile spring 42 connecting the shoes, and a fluid pressure actuated motor corresponding to the motors 34 mounted on the backing plate and connected to the shoes and operative to actuate the shoes into engagement with the drum against the resistance of the retractile spring.

A piston 44 reciprocable in the cylinder is retained against displacement by a washer 46 seated on an annular shoulder in the open end of the cylinder and held in place by a retaining ring 48 fitted in a circumferential groove in the wall of the cylinder. The washer has an axial bore, and formed on the perimeter defining the bore is a flange 50 providing a suitable bearing for the piston. The piston has a solid body portion 52 slidable through the washer 46, and a coextensive cylindrical portion 54 providing a chamber 56 receiving the extension 28 on the head 26 of the cylinder and an annular head. A radial flange 58 on the cylindrical portion 54 of the piston divides the annular space between the wall of the cylinder, the extension on the head of the cylinder, and the piston, into two annular chambers 60 and 62 communicating respectively with the reservoir by way of the ports 20 and 22, and a plurality of spaced passages 64 through the head 58 provide communications between the chambers 60 and 62. A sealing cup 66 seated on the washer 46 in the open end of the cylinder inhibits seepage of fluid from the cylinder, and a collapsible sealing cup 68 seated on the head 58 controls the passages 64 through the head, and a spring 70 interposed between the cups 66 and 68 serves to retain the cups against displacement.

The chamber 56, provided by the cylindrical portion of the piston, has in its bottom a plurality of spaced passages 72 providing communications between the chamber 56 and the annular chamber 60, and arranged in the wall of the chamber 56 adjacent its free end is a port 74, also providing a communication between the chamber 56 and the annular chamber 60. A collapsible sealing cup 76 seated at the bottom of the chamber 56 controls the passages 72, and a sealing cup 78 on the extension 28 seals the chamber 56, and a spring 80 interposed between the cups 76 and 78 serves to retain the cups against displacement and also to return the piston to its retracted position where it is cushioned on the spring 70 between the sealing cups 66 and 68.

The piston has suitably secured thereto a flexible boot 82 embracing the open end of the cylinder for the exclusion of dust and other foreign substances, and arranged in the back of the piston is a recess 84 for the reception of one end of a thrust rod 86. The other end of this thrust rod is pivotally connected to a foot pedal lever 88 pivotally mounted on a fixed support 90 and normally held against a stop 92 by a retractile spring 94 connecting the lever to a fixed support 96.

In a normal operation, upon depressing the foot pedal lever, force is transmitted therefrom through the thrust rod 86 to the piston 44, resulting in moving the piston on its compression stroke. During the initial movement of the piston on its compression stroke, the sealing cup 78 covers the port 74 in the chamber 56, and thereafter, as the piston advances on its compression stroke, fluid is displaced from the chamber 56 through the discharge port 30 and the fluid pressure delivery pipe 32 and its respective branches into the fluid pressure actuated motors, causing actuation of the motors, with the resultant movement of the shoes 40 into engagement with the drums against the resistance of the retractile springs.

As the piston moves on its compression stroke, the capacity of the chamber 60 increases proportionately to the movement of the piston, and this increase in capacity results in the induction of fluid into the chamber 60 from the chamber 62 and passages 64 in the head 58, past the cup 68 into the chamber 60, completely filling the chamber, and during this period of the operation fluid is expelled from the chamber 62 through the port 22 into the reservoir.

Under this condition, upon the conclusion of a braking operation, the operator releases the applied force on the foot pedal lever 88, whereupon the lever is moved under the influence of the spring 94 to its retracted position against the stop 92, and, as the lever moves to its retracted position, the thrust rod 86 connected to the lever is likewise retracted. This results in release of the piston 44 and movement thereof to its retracted position under the influence of the return spring 80.

As the piston moves to its retracted position, fluid is drawn from the reservoir through the port 22 into the chamber 62, and the fluid in the chamber 60 is displaced therefrom under pressure commensurate with the load on the spring 80 through the ports 72, past the cup 76, into the chamber 56. During this movement, fluid is also returning to the chamber 56 from the fluid pressure actuated motors 34, and conduits connecting these motors to the chamber 56, under the influence of the retractile springs connecting the shoes 40 of the respective brake structures. Under this condition the quantity of fluid received by the chamber 56 is in excess of the quantity necessary to completely fill the chamber, and the excess fluid is returned to the reservoir by way of the port 74, the annular chamber 60, and, since the check valve 24 is loaded to open at a predetermined pressure, it is clear that pressure on the fluid in the system may be maintained at all times.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is:

1. A fluid pressure producing device comprising a cylinder, a piston reciprocable therein, a source of fluid supply for said cylinder, a chamber in the piston, a variable chamber between the piston and cylinder and varying in volume with movement of the piston, means for discharging fluid from the chamber during the compression stroke of the piston, means for inducting fluid into the variable chamber during the compression stroke of the piston, and means for displacing fluid from the variable chamber into the chamber during the retraction stroke of the piston.

2. A fluid pressure producing device comprising a reservoir, a cylinder supplied therefrom, a head on the cylinder having an extension protruding into the cylinder, said head and extension having a bore providing a discharge port, a piston reciprocable in the cylinder having a chamber receiving the extension, a head on the piston between the cylinder and the extension, valve means between said cylinder and reservoir controlling flow therebetween, and valve means between said cylinder and chamber permitting flow from said cylinder into said chamber during the return stroke of said piston.

3. A fluid pressure producing device comprising a reservoir, a cylinder supplied therefrom, valve means controlling communication between said reservoir and cylinder, a retaining ring in one end of the cylinder, a head on the other end of the cylinder having a concentric extension projecting into the cylinder, said head and extension having a bore providing a discharge port for the cylinder, a piston reciprocable in the retaining ring having a chamber receiving the extension on the head of the cylinder, a head on the piston slidable between the cylinder and the extension to create pressure in said cylinder during the return stroke of said piston, and valve means permitting flow from said cylinder to said chamber during return stroke of said piston.

4. A fluid pressure producing device comprising a reservoir, a cylinder supplied therefrom, a retaining ring in one end of the cylinder, a head on the other end of the cylinder having a concentric extension protruding into the cylinder, said head and extension having a bore therethrough providing a discharge port for the cylinder, a piston reciprocable in the retaining ring, a chamber in the piston receiving the extension on the head of the cylinder, said chamber having ports providing communications between the chamber and the cylinder, means for closing said ports during the compression stroke of the piston, an annular head on the piston slidable between the cylinder and the extension on the head, said annular head having passages therethrough, and a collapsible sealing cup closing the passages during the return stroke of the piston.

5. A fluid pressure producing device comprising a reservoir, a cylinder supplied therefrom, a retaining ring in one end of the cylinder, a sealing cup seated on the retaining ring, a head on the other end of the cylinder having a concentric extension protruding into the cylinder, said head and extension having an axial bore providing a discharge port for the cylinder, a piston reciprocable in the retaining ring, a chamber coextensive with the piston receiving the extension on the head of the cylinder, said chamber having ports providing communications between the chamber and the cylinder, means for closing said ports during the compression stroke of the piston, means for sealing the chamber carried by the piston and the extension on the head, a spring between the sealing means, an annular head on the piston dividing the cylinder into two annular chambers, said head having openings therethrough providing communications between the annular chambers, a collapsible sealing cup on the head closing the openings during the return stroke of the piston, and a spring interposed between the cup on the head and the cup on the retaining ring.

6. A fluid pressure producing device comprising a reservoir, a cylinder supplied therefrom, a retaining ring in one end of the cylinder, a head on the other end of the cylinder having a concentric extension protruding into the cylinder, said head and extension having passages therethrough providing a discharge port for the cylinder, a piston reciprocable in the retaining ring, a chamber co-extensive with the piston receiving the extension on the head of the cylinder, said chamber having spaced ports in its bottom and a port adjacent its open end providing communications between the chamber and the cylinder, a collapsible sealing cup in the bottom of the chamber closing the spaced ports during the compression stroke of the piston, a sealing cup on the extension on the head of the cylinder for closing the other port during the compression stroke of the piston, a spring interposed between the cups, an annular head on the piston dividing the cylinder into two annular chambers, said head having openings therethrough providing communications between the annular chambers, a collapsible sealing cup on the head of the piston closing the openings therein during the return stroke of the piston, a sealing cup on the retaining ring, and a spring interposed between the cups.

HERBERT C. BOWEN.